Patented May 8, 1928.

1,668,838

UNITED STATES PATENT OFFICE.

GROVER BLOOMFIELD, OF TERRE HAUTE, INDIANA, ASSIGNOR TO COMMERCIAL SOLVENTS CORPORATION, OF TERRE HAUTE, INDIANA, A CORPORATION OF MARYLAND.

ZINC OXIDE CATALYSTS.

No Drawing. Application filed June 21, 1926, Serial No. 117,601. Renewed October 12, 1927.

My invention relates to the preparation of zinc oxide in dense granular form, whereby its activity in catalyzing various organic reactions is increased. The flocculent character of zinc oxide and the friability of its granules prepared by ordinary methods has rendered difficult the use of this material as a catalytic substance in vapor phase reactions.

The present invention pertains to the production of zinc oxide in hard dense granular form of superior catalytic activity. One use to which such material may be put is in the catalytic synthesis of methanol and other alcohols by the reaction of hydrogen and carbon oxides at elevated temperatures and pressures, though these granules of zinc oxide are equally well suited for use in other catalytic reactions—for example dehydrogenation and dehydration of various organic substances—the production of formaldehyde and methyl alcohol from formic acid, etc.

Briefly my invention consists in mixing zinc oxide with a solution of a volatile ammonium salt, such for example, as ammonium nitrate, after which the mixture is dried and ignited, whereupon dense hard granules of high catalytic activity are produced. An even better catalyst may be prepared by precipitating a soluble zinc salt such as zinc nitrate with ammonium hydroxide, whereby the same chemical mixture is obtained and is treated in the same manner.

As a further aid to the understanding of my invention the following specific examples are given.

Example I.

100 grams of zinc nitrate $$(Zn(NO_3)_2.6H_2O)$$

is dissolved by heating in 25 c. c. of water and to the solution is gradually added with stirring the theoretical quantity (44 c. c. of 12.5 normal) of ammonium hydroxide required to precipitate zinc hydroxide.

The mass is filtered without washing, whereby some ammonium nitrate remains in the mass. This is dried and ignited as moderate heat in any convenient fashion—for example in a porcelain crucible. During ignition zinc hydroxide is transformed to zinc oxide and considerable decrepitation occurs. For this reason the ignition heat should be moderated to avoid too rapid an expansion, and to produce the largest granules. The crusty residue obtained on ignition is broken up into granules whereupon it is ready for use.

Example II.

In this case the procedure is the same up to the time of filtering. Subsequent to filtering the pasty mass is washed with 40 c. c. of water. The subsequent procedure is the same, but the water-washed product may be more rapidly ignited as less decrepitation occurs.

Example III.

25 grams of ammonium nitrate $$(NH_4NO_3)$$

is dissolved in 7 c. c. of water by heating and the hot solution is poured, with stirring, on 25 grams of zinc oxide. On cooling, the mass solidifies. It is broken up and ignited at moderate heat, whereupon a firm crust of zinc oxide results which, after breaking it up into suitable granules, is ready for use.

Example IV.

While my invention is primarily devoted to the production of a pure zinc oxide catalyst mass, one may incorporate into the zinc oxide, prior to treatment, a lesser quantity of some other metallic oxide which may serve as a catalyst promoter. For example a firm granular zinc oxide catalyst containing another oxide such as chromic oxide, tungsten oxide, uranium oxide, may be prepared by a process similar to the following:—

75 grams of zinc oxide and 22 grams of chromic oxide are well mixed by sifting and the mixture is added to a hot saturated solution of from 85–125 grams of ammonium nitrate. On cooling the mass solidifies. It is broken up and ignited as described in the previous examples.

The exact phenomena producing the improved catalytic action in zinc oxide catalysts prepared in accordance with my invention is not known to me. It is probable that the zinc oxide catalysts contain traces of nitrates and ammonia after ignition, but whether it is the presence of traces of these substances, or the physical action on the zinc oxide during the treatment that produces the improved result is not known.

The fact that zinc oxide prepared by the precipitation of zinc hydroxide from zinc nitrate by means of ammonia produces still better results would indicate that the source of the zinc oxide influences the catalytic activity.

The great improvement in the catalytic activity of zinc oxide prepared in accordance with my invention is indicated in the appended table which displays results obtained in the catalysis of the synthetic methanol reaction. For purposes of comparison a mixture of gases comprising 8% carbon dioxide, 2% carbon monoxide, and 90% hydrogen was passed through 10 c. c. of catalyst granules at a space velocity of 75,000, at a pressure of 2,000 pounds, and at a temperature of 380–400° C. The reacted gases were cooled and the methanol fraction condensed and recovered in liquid form. The comparison of catalysts is made against (A) pure zinc oxide granules prepared by moistening powdered zinc oxide, compressing it into pellets, and drying the pellets, and (B) with zinc oxide prepared in granular form by the decrepitation of zinc hydrate.

| Catalyst. | Hourly yield of condensate in c. c. | Methanol. |
|---|---|---|
|  |  | *Per cent.* |
| A | Trace. | Trace. |
| B | 8 | 50 |
| Example I | 20 | 65 |
| II | 17 | 60 |
| III | 15 | 52 |
| IV | 16 | 60 |

For the purpose of comparison a definite set of reaction conditions is established but it should be understood that variance of these conditions, while producing a change in results, does not modify the comparative catalyst efficiency. For example methanol is produced under reaction conditions at pressures as low as 50 atmospheres. The precise lower temperature range varies with the composition of the gas mixture, but in general is around 300° C.

Increase in the space velocity and increase in the operating pressure improves the yield from the reaction. Increase in the per cent of carbon monoxide content of the carbon oxides in the gas mixture produces an increased yield of methanol.

While I have described the use of my improved catalysts in connection with the production of synthetic methanol it should be understood that their usefulness is by no means so limited and that they are generally useful as dehydration and dehydrogenation catalysts in organic reactions.

Now having described my invention I claim the following as new and novel:

1. A catalyst prepared by igniting moist zinc oxide containing traces of ammonia and nitrates.

2. A process for preparing a catalyst which comprises combining zinc oxide with a solution of ammonium nitrate, and igniting the mass.

3. A process for preparing a catalyst which comprises adding a solution of ammonium nitrate to a mixture of zinc oxide and a promoting oxide, and igniting the mass.

4. A process for preparing a catalyst which comprises adding a solution of ammonia nitrate to a mixture of zinc oxide and a lesser quantity of chrominum oxide, and igniting the mass.

In testimony whereof I affix my signature.

GROVER BLOOMFIELD.